US010538180B2

(12) United States Patent
Nishimoto et al.

(10) Patent No.: US 10,538,180 B2
(45) Date of Patent: Jan. 21, 2020

(54) CONVEYANCE SEAT

(71) Applicant: TS TECH CO., LTD., Asaka-shi, Saitama (JP)

(72) Inventors: Naoya Nishimoto, Tochigi (JP); Kazuaki Mima, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/960,850

(22) Filed: Apr. 24, 2018

(65) Prior Publication Data

US 2019/0106033 A1  Apr. 11, 2019

(30) Foreign Application Priority Data

Oct. 5, 2017 (JP) .................................. 2017-195381
Oct. 5, 2017 (JP) .................................. 2017-195382

(51) Int. Cl.
*B60N 2/58* (2006.01)
*B60N 2/68* (2006.01)

(52) U.S. Cl.
CPC ............ *B60N 2/5883* (2013.01); *B60N 2/686* (2013.01)

(58) Field of Classification Search
CPC .... B60N 2/686; B60N 2/5816; B60N 2/5825; B60N 2/5883
See application file for complete search history.

(56) References Cited

U.S. PATENT DOCUMENTS

| | | | | |
|---|---|---|---|---|
| 4,579,389 A | * | 4/1986 | Shimbori | A47C 7/18 297/452.6 |
| 5,733,001 A | * | 3/1998 | Roberts | B60N 2/5825 24/297 |
| 6,027,171 A | * | 2/2000 | Partington | B60N 2/0232 297/452.18 |
| 7,222,915 B2 | * | 5/2007 | Philippot | B60N 2/70 297/216.13 |

(Continued)

FOREIGN PATENT DOCUMENTS

| | | |
|---|---|---|
| JP | S59-36772 U | 3/1984 |
| JP | H07-163769 A | 6/1995 |

(Continued)

OTHER PUBLICATIONS

PCT Search Report and Written Opinion issued in related application PCT/JP2018/007689, dated May 29, 2018, with partial English language translation, 12 pages.

*Primary Examiner* — Philip F Gabler
(74) *Attorney, Agent, or Firm* — Drinker Biddle & Reath LLP

(57) ABSTRACT

Provided is a conveyance seat including a lateral support portion that provides good appearance. A lateral support portion of a seat back includes a base member that defines an outline of the lateral support portion and a surface cover arranged to cover the base member to form an outer surface of the lateral support portion. The surface cover includes multiple surface cover pieces interfaced with each other to form the surface cover and a strip-shaped body that extends (Continued)

out of the interface between the surface cover pieces in a reverse side portion of the surface cover. In a state where the surface cover covers the base member, the strip-shaped body is pulled toward a side of the base member opposite to that on which the interface is positioned with respect to the base member.

17 Claims, 14 Drawing Sheets

(56) References Cited

U.S. PATENT DOCUMENTS

| | | | |
|---|---|---|---|
| 8,733,834 B2* | 5/2014 | Palmer | B60N 2/585 |
| | | | 297/218.1 |
| 8,991,934 B2* | 3/2015 | Sei | B60N 2/5825 |
| | | | 297/452.59 |
| 9,056,568 B2* | 6/2015 | Matsumoto | B60N 2/4228 |
| 10,093,210 B2* | 10/2018 | Izawa | B60N 2/68 |
| 2008/0136237 A1* | 6/2008 | Kayumi | B60N 2/99 |
| | | | 297/284.9 |
| 2015/0175044 A1* | 6/2015 | Akutsu | B60N 2/5825 |
| | | | 297/452.18 |
| 2017/0106777 A1 | 4/2017 | Izawa et al. | |
| 2019/0106033 A1* | 4/2019 | Nishimoto | B60N 2/5883 |

FOREIGN PATENT DOCUMENTS

| | | |
|---|---|---|
| JP | H10-015266 A | 1/1998 |
| JP | 2015-137021 A | 7/2015 |
| JP | 2017-019364 A | 1/2017 |
| JP | 2018-023642 A | 2/2018 |

* cited by examiner

INSIDE ←——→ OUTSIDE
SEAT WIDTH
DIRECTION

OUTSIDE ←→ INSIDE
SEAT WIDTH DIRECTION

US 10,538,180 B2

CONVEYANCE SEAT

CROSS REFERENCE TO RELATED APPLICATIONS

This application is based upon and claims the priority benefit of Japanese Patent Application Nos. JP 2017-195381 and JP 2017-195382, filed Oct. 5, 2017, the contents of each of which are incorporated herein by reference in their entireties.

BACKGROUND

The present disclosure relates to conveyance seats and, in particular, to a conveyance seat including a lateral support portion positioned laterally relative to a back support portion configured to support the back of a seated person.

There have already been known conveyance seats including a lateral support portion positioned laterally relative to a back support portion for supporting the back of a seated person, including, for example, the seat described in Japanese Unexamined Patent Application Publication No. 2015-137021. In the seat described in Japanese Unexamined Patent Application Publication No. 2015-137021, the lateral support portion (referred to as "seat back side portion" in Japanese Unexamined Patent Application Publication No. 2015-137021) is formed by a base member (referred to as "seat back side portion main body" in Japanese Unexamined Patent Application Publication No. 2015-137021) made of resin and a surface cover (referred to as "surface skin material" in Japanese Unexamined Patent Application Publication No. 2015-137021) covering the base member.

The lateral support portion provides a good appearance with its component part, the surface cover, being stretched adequately. Particularly, if the surface cover is formed by interfacing multiple surface cover pieces, the appearance of the interface between the surface cover pieces is important to ensure the quality of such a conveyance seat. Hence, the present disclosure has been made in consideration of the above-described problem, and various embodiments described herein provide a conveyance seat including a lateral support portion with good appearance.

SUMMARY

In order to solve the above-described problem, a conveyance seat according to an embodiment of the present disclosure has a back support portion for supporting the back of a seated person and a lateral support portion positioned lateral to the back support portion, in which the lateral support portion includes a base member for defining the outline of the lateral support portion and a surface cover arranged to cover the base member to form the outer surface of the lateral support portion, and the surface cover includes multiple surface cover pieces interfaced with each other to form the surface cover and an extending portion extending out of the interface between the surface cover pieces in a reverse side portion of the surface cover, in which in a state where the surface cover covers the base member, the extending portion is pulled toward the side opposite to that on which the interface between the surface cover pieces is positioned with respect to the base member.

In the thus arranged conveyance seat according to the present disclosure, the extending portion attached to the interface between the surface cover pieces in the surface cover is pulled toward the reverse side of the base member. This causes the interface between the surface cover pieces to be stretched adequately. As a result, the lateral support portion provides good appearance.

In the conveyance seat according to an embodiment of the present disclosure, it is also preferred that the extending portion is a strip-shaped body, the base member has a slit hole, and in a state where the surface cover covers the base member, the strip-shaped body is put through the slit hole to be pulled toward the side opposite to that on which the interface between the surface cover pieces is positioned with respect to the base member. In the arrangement above, the strip-shaped body serving as the extending portion is put and pulled through the slit hole provided in the base member. This allows the strip-shaped body to have a shorter length compared to the arrangement in which the strip-shaped body is pulled hanging on an outer edge portion of the base member.

In the conveyance seat according to an embodiment of the present disclosure, it is also preferred that the multiple surface cover pieces are interfaced by sewing, and the extending portion is sewn together with the multiple surface cover pieces at the interface between the surface cover pieces. In the arrangement above, since the extending portion is sewn together with the multiple surface cover pieces, the extending portion and the multiple surface cover pieces are sewn collectively. This results in that the extending portion can be attached efficiently.

In the conveyance seat according to an embodiment of the present disclosure, it is also preferred that multiple strip-shaped bodies are provided along the interface between the surface cover pieces, and the base member has the slit hole, one for each of the multiple strip-shaped bodies. In the embodiment above, the slit hole through which each strip-shaped body is put is provided (separately) for each of the strip-shaped bodies. In accordance with this arrangement, the strip-shaped bodies can be put adequately through the slit holes while the reduction in the strength of the base member with the formation of the slit holes is minimized, compared to the case where a relatively large slit hole through which all the strip-shaped bodies can be put is provided as a common slit hole for the strip-shaped bodies.

In the conveyance seat according to an embodiment of the present disclosure, it is also preferred that in a state where the surface cover covers the base member, a portion in the reverse side portion of the surface cover to which the strip-shaped body is attached and a portion of the base member in which the slit hole is provided are arranged in a manner overlapping each other. In accordance with the arrangement above, since the slit hole is arranged at a position alongside the strip-shaped body, it is possible for the strip-shaped body to be put easily through the slit hole and have a shorter length.

In the conveyance seat according to an embodiment of the present disclosure, it is also preferred that the extending portion is composed of a material less expansible than the material of the surface cover pieces. In accordance with the arrangement above, since the extending portion is stabilized in a pulled state, it is possible to adequately maintain the state where the interface between the surface cover pieces is stretched in the surface cover. As a result, the lateral support portion provides better appearance.

In the conveyance seat according to an embodiment of the present disclosure, it is also preferred that the surface of the base member is formed with a groove portion into which the interface between the surface cover pieces gains entry, and in a state where the surface cover covers the base member, a base portion of the extending portion that is attached to the interface between the surface cover pieces is arranged within the groove portion. The portion of the surface cover to which the base portion of the extending portion is attached, that is, the interface between the surface cover pieces has a thickness greater than those of the other portions. In the arrangement above, the interface between the surface cover pieces can be accommodated within the groove portion and thereby the thickened portion of the surface cover can be made less prominent.

In the conveyance seat according to an embodiment of the present disclosure, it is also preferred that the multiple surface cover pieces include a first surface cover piece positioned on one end side and a second surface cover piece positioned on the end side in the width direction of the conveyance seat, a base portion of the extending portion to be attached to the interface between the surface cover pieces is attached to the interface between the surface cover pieces with being in contact with the first surface cover piece, and a free end portion of the extending portion positioned on the side opposite to that of the base portion is put through the slit hole and engaged with a portion of the base member closer to the first surface cover piece than the second surface cover piece. In the arrangement above, the base portion and the free end portion of the extending portion are provided closer to the first surface cover piece in the width direction of the conveyance seat. In accordance with this arrangement, the extending portion can have a shorter length.

In the conveyance seat according to an embodiment of the present disclosure, it is also preferred that the opening of the slit hole faces one end side in the width direction of the conveyance seat, and a free end portion of the extending portion positioned on the side opposite to that of a base portion to be attached to the interface between the surface cover pieces leaves the slit hole through the opening to hang on one end portion of the base member in the width direction. In the arrangement above, the free end portion of the extending portion leaves the slit hole through the opening of the slit hole to hang the end portion of the base member positioned on the same side as the opening. In accordance with this arrangement, the free end portion of the extending portion can be fastened at the base member with a simpler structure.

In the conveyance seat according to an embodiment of the present disclosure, it is also preferred that a reverse side of the base member has a protrusion portion on which a free end portion of the extending portion positioned on the side opposite to that of a base portion to be attached to the interface between the surface cover pieces hangs and a convex portion having a larger amount of protrusion than the protrusion portion and, in a state where the lateral support portion is mounted on a vehicle body, engaged or in contact with a portion of the vehicle body, in which the slit hole is provided between the protrusion portion and the convex portion in the width direction of the conveyance seat. In the arrangement above, since the protrusion portion and the convex portion are positioned on either side of the slit hole, the free end portion of the extending portion can easily hang on the protrusion portion while avoiding interference with the convex portion.

In accordance with an embodiment of the conveyance seat according to the present disclosure, the interface between the surface cover pieces is stretched adequately and, as a result, the lateral support portion provides good appearance. Also, in accordance with an embodiment of the conveyance seat according to the present disclosure, the strip-shaped body serving as the extending portion has a shorter length compared to an arrangement in which the strip-shaped body is pulled hanging on an outer edge portion of the base member.

Also, in accordance with an embodiment of the conveyance seat according to the present disclosure, since the extending portion and the multiple surface cover pieces are sewn collectively, the extending portion can be attached efficiently. Also, in accordance with an embodiment of the conveyance seat according to the present disclosure, each strip-shaped body can be put adequately through each slit hole while the reduction in the strength of the base member with the formation of each slit hole is minimized. Also, in accordance with an embodiment of the conveyance seat according to the present disclosure, the strip-shaped body can be put easily through the slit hole and have a shorter length. Also, in accordance with an embodiment of the conveyance seat according to the present disclosure, the extending portion is stabilized in a pulled state, and the state is maintained adequately where the interface between the surface cover pieces is stretched in the surface cover. As a result, the lateral support portion provides better appearance. Also, in accordance with an embodiment of the conveyance seat according to the present disclosure, the interface between the surface cover pieces is accommodated within the groove portion, so that the thickened portion of the surface cover can be made less prominent. Also, in accordance with an embodiment of the conveyance seat according to the present disclosure, since the base portion and the free end portion of the extending portion are positioned on the same side in the width direction of the conveyance seat, the extending portion has a shorter length. Also, in accordance with an embodiment of the conveyance seat according to the present disclosure, the free end portion of the extending portion can be fastened at the base member with a simpler structure. Also, in accordance with an embodiment of the conveyance seat according to the present disclosure, the free end portion of the extending portion can easily hang on the protrusion portion while avoiding interference with the convex portion.

BRIEF DESCRIPTION OF THE DRAWINGS

Various embodiments of the invention are illustrated in the drawings, in which.

DETAILED DESCRIPTION

Exemplary configurations of a conveyance seat according to an embodiment (this embodiment) of the present disclosure are hereinafter described. It is noted that in this embodiment, a seat (hereinafter referred to as "seat S") to be mounted on a vehicle will hereinafter be described as an example of the conveyance seat. However, the present disclosure is also applicable to a conveyance seat to be mounted on a conveyance other than vehicles, such as vessels and aircrafts.

In the following description, "front to back direction" is a direction corresponding to the front-to-back direction of the seat S and coincides with the direction of travel of a vehicle on which the seat S is mounted. Further, "seat width direction" is the width direction (lateral width direction) of the seat S as well as the lateral direction of the seat S in a front view. In addition, "vertical direction" is the vertical direction of a seat back 1 that the seat S has, coinciding with the vertical direction of a lateral support portion 4 that forms a lateral end portion of the seat back 1. Further, "outside" in the seat width direction corresponds to one end side in the seat width direction and specifically means the side closer to a vehicle door. In addition, "inside" in the seat width direction corresponds to the other end side in the seat width direction and means the side closer to the center of the vehicle in the lateral direction.

It is noted that the following description of the position of each portion of the seat S is based on a person seated on the seat S (an occupant of the vehicle) unless otherwise noted.

Basic Configuration of the Seat S

Figure 1:
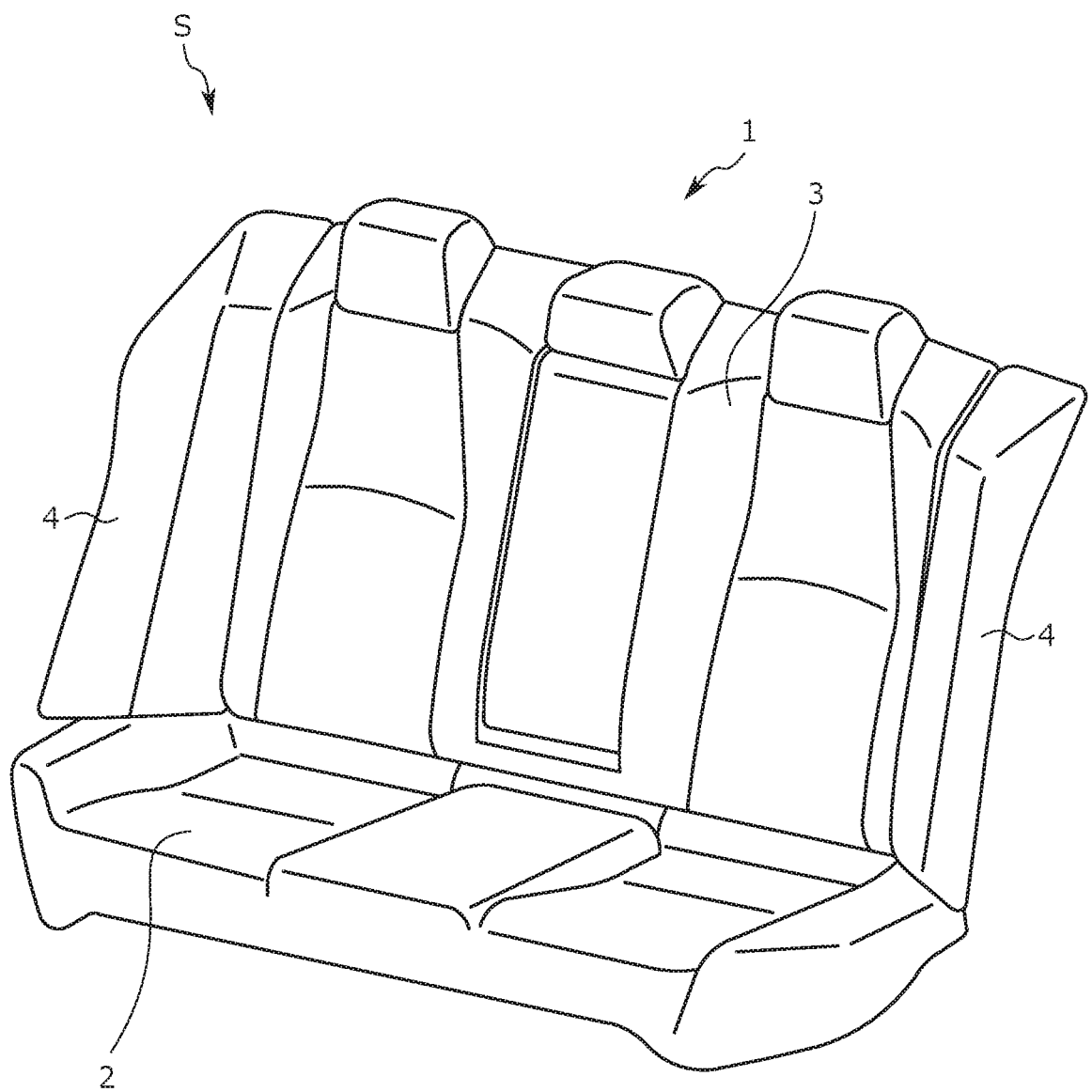
FIG. 1 is a perspective view of a conveyance seat according to an embodiment of the present disclosure.

The seat S is utilized as a rear seat in the vehicle and, as shown in FIG. 1, has a seat back 1 and a seat cushion 2. FIG. 1 is a perspective view of the seat S. The seat back 1 is a portion for supporting the upper body of the seated person and the seat cushion 2 is a portion on which the hip and thigh of the occupant is placed. It is noted that the seat S shown in FIG. 1 is a double seat, but is not limited thereto, and may be a single seat or a seat on which three or more persons can be seated, in other embodiments.

As shown in FIG. 1, the seat back 1 has a back support portion 3 and a lateral support portion 4. The back support portion 3 is a main body portion of the seat back 1 provided in a central portion in the seat width direction of the seat back 1 to support the back of the seated person. The lateral support portion 4 is positioned lateral to the back support portion 3 and, specifically, arranged between the back support portion 3 and a vehicle door (not shown) in the seat width direction. The front surface of the lateral support portion 4 is positioned beside the seated person to laterally support a portion of the seated person from his/her shoulder to lower back. As shown in FIG. 1, the front surface of the lateral support portion 4 is also positioned anterior to the front surface of the back support portion 3 and further inclined forward as closer to the outside in the seat width direction.

The lateral support portion 4 is fixed to the vehicle body. Specifically, a fastening portion (not shown) is provided in a portion of the vehicle body positioned posterior to the lateral support portion 4 and, through the fastening portion, the lateral support portion 4 is fastened to the vehicle body. In addition, a lower end portion of the lateral support portion 4 (strictly a lower end portion of a base member 10) is bolted to a vehicle body floor of the vehicle body.

Configuration of the Lateral Support Portion 4

Figure 2:
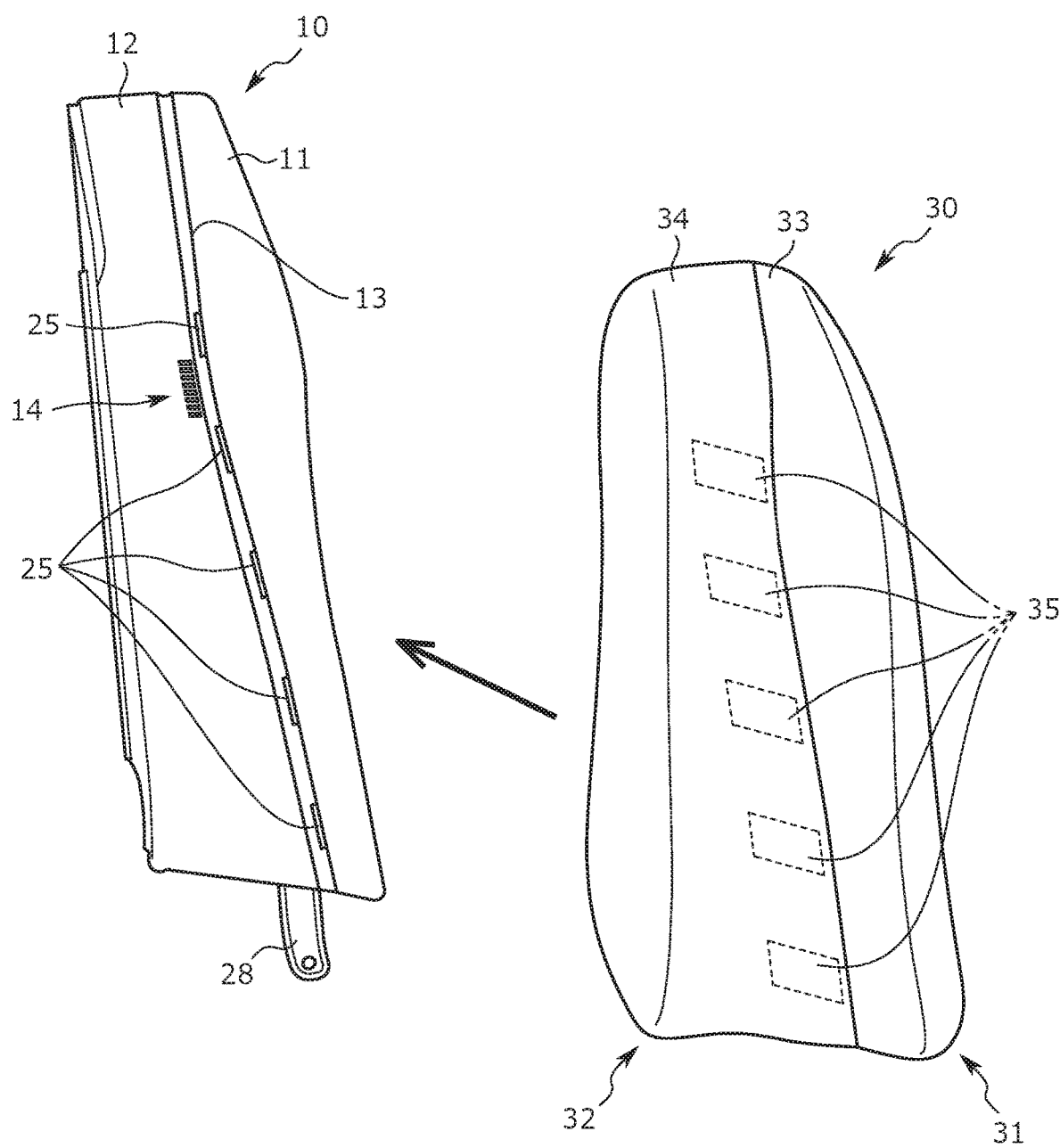
FIG. 2 is a front view that shows component parts of a lateral support portion.
Figure 3:
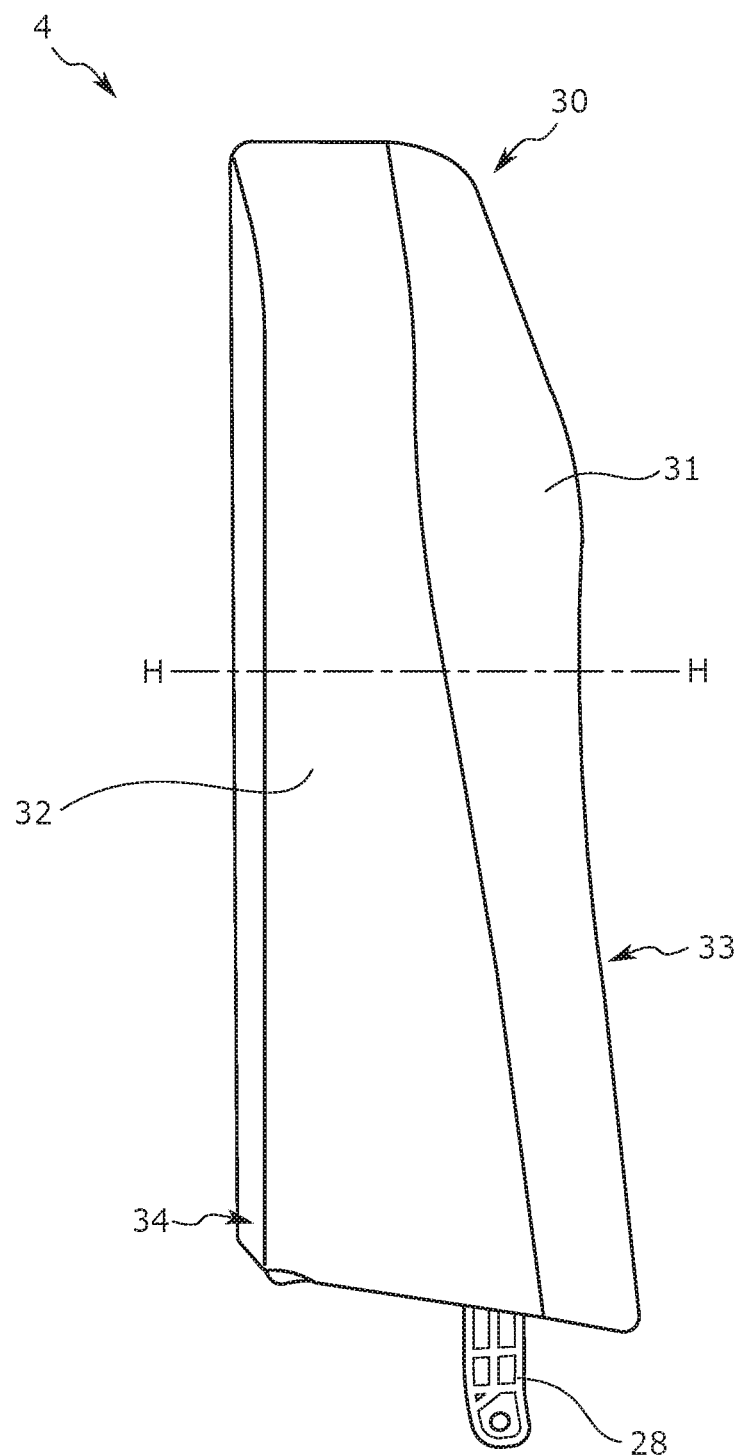
FIG. 3 is a front view of the lateral support portion.

The lateral support portion 4 is now described. As shown in FIG. 2, the lateral support portion 4 is formed by covering the base member 10 (serving as a skeleton) with a surface cover 30 from a front of the base member 10. The thus-formed lateral support portion 4 provides the appearance shown in FIG. 3 and extends vertically to have a sufficient length as well as being relatively widened in the seat width direction, as shown in FIG. 3. It is noted that FIG. 2 shows component parts of the lateral support portion 4 and FIG. 3 is an external view of the lateral support portion 4.

The base member 10 is configured to define an outline of the lateral support portion 4 and, in this embodiment, is formed as a resin molded article. However, the base member 10 may be formed as a metal member and, more specifically, formed by processing and shaping a metal plate.

The base member 10 is shaped in an approximately plate-like form and has a quadrilateral-like shape like the leading end portion of a knife in a front view. Also, the front surface of the base member 10 is approximately planar. The structure of the base member 10 is hereinafter described in detail. It is noted that in the following description, the side of the base member 10 in the thickness direction closer to the body of the seated person in a state seated on the seat S is called an "obverse side", while the side farther away from the body of the seated person is called a "reverse side".

Figure 4:
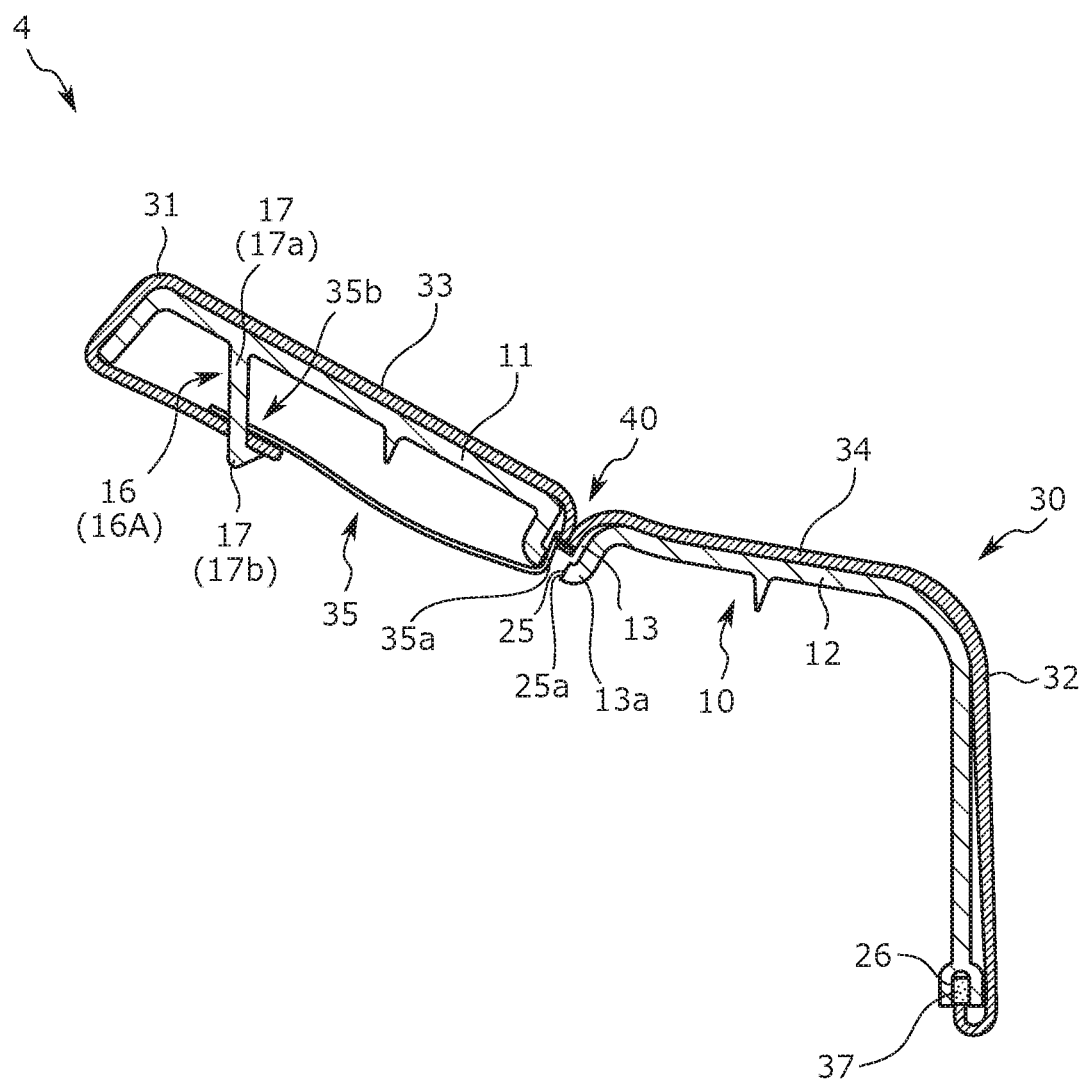
FIG. 4 is a cross-sectional view taken along H-H in FIG. 3.

As shown in FIG. 4, the surface cover 30 is a member covering the obverse side of the base member 10 to form the outer surface of the lateral support portion 4. FIG. 4 is a cross-sectional view of the lateral support portion 4, specifically, taken along H-H in FIG. 3.

The surface cover 30 is composed of fabric (cloth), natural leather, or artificial leather, or laminate thereof. The surface cover 30 has a generally small thickness, the surface of which is comfortable to the touch with the body of the seated person. It is noted that in the following description, the side of the surface cover 30 in the thickness direction closer to the body of the seated person in a state seated on the seat S (i.e. the exposed side) is called an "obverse side", while the side farther away from the body of the seated person (i.e. the side adjacent to the base member 10) is called a "reverse side".

In this embodiment, the surface cover 30 is formed by interfacing multiple surface cover pieces with each other. More specifically, the surface cover 30 is formed by sewing two surface cover pieces separated in the seat width direction. That is, as shown in FIG. 4, an interface (hereinafter referred to as "interface 40") between the surface cover pieces is formed in a central portion in the seat width direction of the surface cover 30. At the interface 40, end portions in the seat width direction of each surface cover piece are folded back to the reverse side and the folded end portions of each surface cover piece are interfaced with each other by sewing.

It is noted that one of the two surface cover pieces forming the surface cover 30 positioned on the outside (one end side) in the seat width direction will hereinafter be referred to as "outside surface cover piece 33", while the other positioned on the inside (the other end side) will hereinafter be referred to as "inside surface cover piece 34". Here, the outside surface cover piece 33 corresponds to a first surface cover piece and the inside surface cover piece 34 corresponds to a second surface cover piece. Also, in this embodiment, the surface cover 30 is formed by interfacing two surface cover pieces with each other, but other embodiments are not limited thereto, and may be formed by interfacing three or more surface cover pieces with each other.

The surface cover 30 is fastened to the base member 10 in a state covering the base member 10. More specifically, as shown in FIG. 4, an outer end portion (hereinafter referred to as "outer end portion 31") in the seat width direction of the surface cover 30 lies on a portion of the base member 10 positioned on the outside in the seat width direction (hereinafter referred to as "outer base portion 11"). It is noted that the outer end portion 31 is formed by an outer end portion in the seat width direction of the outside surface cover piece 33. As shown in FIG. 4, the outer end portion 31 is then folded along a portion of the outer edge of the base member 10, positioned outside in the seat width direction, to come around behind the base member 10.

As shown in FIG. 4, the inner end portion (hereinafter referred to as "inner end portion 32") in the seat width direction of the surface cover 30 hangs on a portion of the base member 10 positioned on the inside in the seat width direction (hereinafter referred to as "inner base portion 12") and tucked into a tuck groove 26 provided in the inner base portion 12. It is noted that the inner end portion 32 is formed by an inner end portion in the seat width direction of the inside surface cover piece 34. As shown in FIG. 4, the inner end portion 32 is then folded along a portion of the outer edge of the base member 10 positioned inside in the seat width direction.

The interface 40 of the surface cover 30 is pulled and drawn toward the reverse side of the base member 10 (i.e. opposite to the side of the base member 10 on which the interface 40 is positioned).

Configuration for the Surface Cover 30 to be Fastened to the Base Member 10

Figure 5:
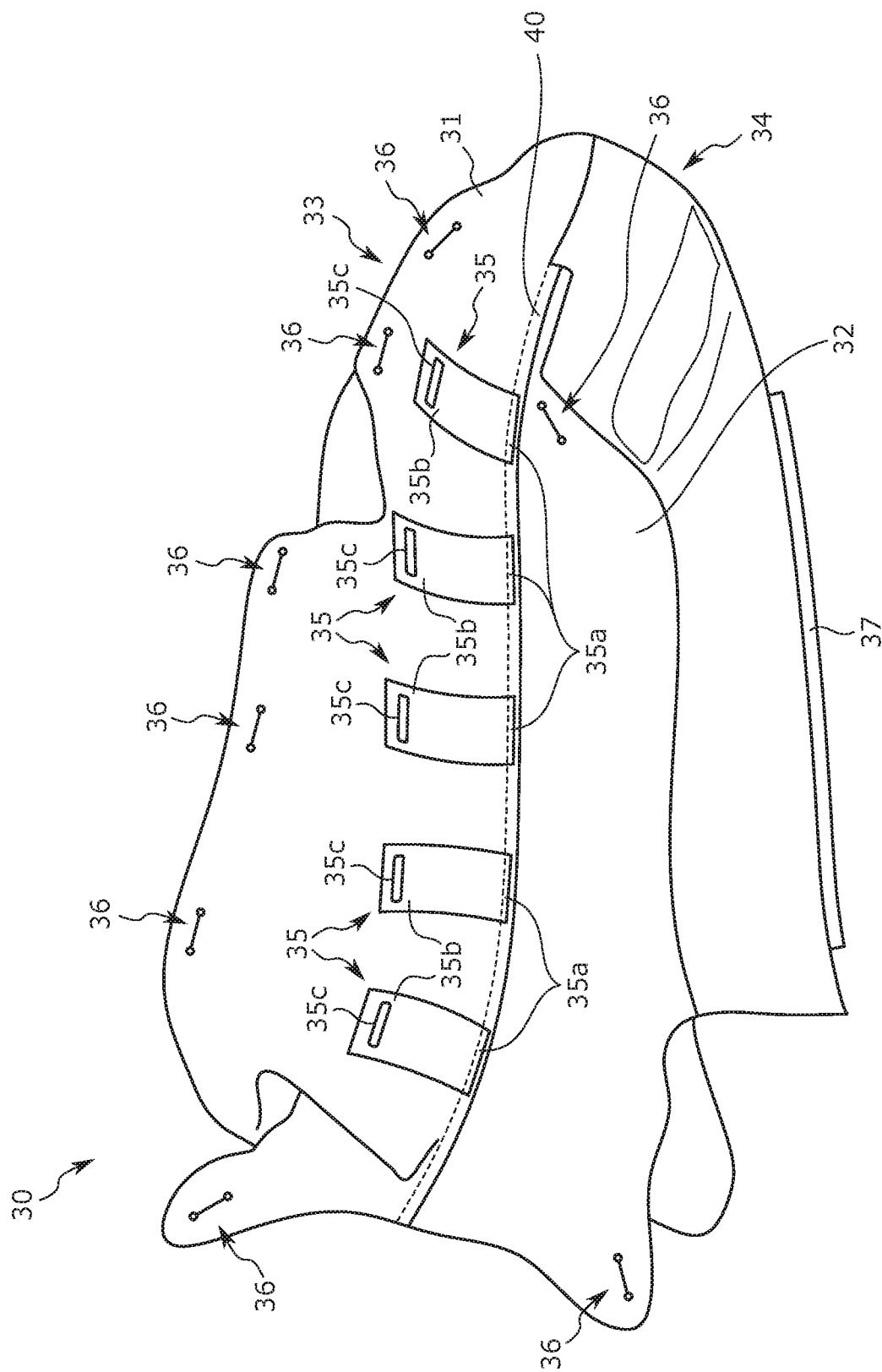
FIG. 5 is a rear view of a surface cover (a reverse side of the surface cover)

A mechanism of the surface cover 30 for fastening each portion (specifically, the outer end portion 31, the inner end portion 32, and the interface 40) of the surface cover 30 to the base member 10 is hereinafter described with reference to FIGS. 4 and 5. FIG. 5 shows the reverse side of the surface cover 30.

The outer end portion 31 of the surface cover 30 is formed with notched holes (hereinafter referred to as "latch holes 36") for insertion of protrusions (specifically, protrusion portions 16 described below) therethrough, protruding from the reverse side of the outer base portion 11 of the base member 10. As shown in FIG. 5, the multiple latch holes 36 are provided vertically with spacing therebetween.

The inner end portion 32 of the surface cover 30 is also provided with latch holes 36. As shown in FIG. 5, the two latch holes 36 are provided at vertically spaced positions in the inner end portion 32. As shown in FIG. 5, a vertically extending trim cord 37 is also attached to a portion of the inner end portion 32 positioned vertically between the latch holes 36. The trim cord 37 is a portion arranged to gain entry and be tucked into the tuck groove 26 provided in the inner base portion 12 of the base member 10.

Strip-shaped bodies 35 serving as extending portions are attached to the interface 40 of the surface cover 30. The strip-shaped bodies 35 are reed-shaped belts extending from the interface 40 in a reverse side portion of the surface cover 30. The strip-shaped bodies 35 are pulled and drawn toward the reverse side of the base member 10 (i.e. opposite to the side of the base member 10 on which the interface 40 is positioned) when the surface cover 30 is fastened to the base member 10.

With the strip-shaped bodies 35 being pulled, the free end portions 35b of the strip-shaped bodies 35 then hang on protrusions (specifically, protrusion portions 16 described hereinafter) protruding from the reverse side of the outer base portion 11 of the base member 10. It is noted that the free end portions 35b are positioned on the side opposite to that of base portions 35a of the strip-shaped bodies 35 attached to the interface 40, each being one short side portion of each rectangular strip-shaped body 35. Further, the free end portions 35b are each formed with a hole (hereinafter referred to as "clasping hole 35c") for insertion of a protrusion of the base member 10 therethrough.

As shown in FIG. 5, the multiple (five in the case shown in FIG. 5) strip-shaped bodies 35 are provided with spacing therebetween along the interface 40. Also, the strip-shaped bodies 35 in this embodiment are composed of a material less stretchable than the material of the surface cover pieces (i.e. the outside surface cover piece 33 and the inside surface cover piece 34) forming the surface cover 30, such as nylon belts.

In this embodiment, each strip-shaped body 35 is also sewn together with each surface cover piece (i.e. the outside surface cover piece 33 or the inside surface cover piece 34) at the interface 40. More specifically, the base portion 35a of each strip-shaped body 35 is sewn into each surface cover piece. As shown in FIG. 4, the base portions 35a are also attached to the interface 40 in a state in contact with the outside surface cover piece 33.

Structure of the Base Member 10

Figure 6:
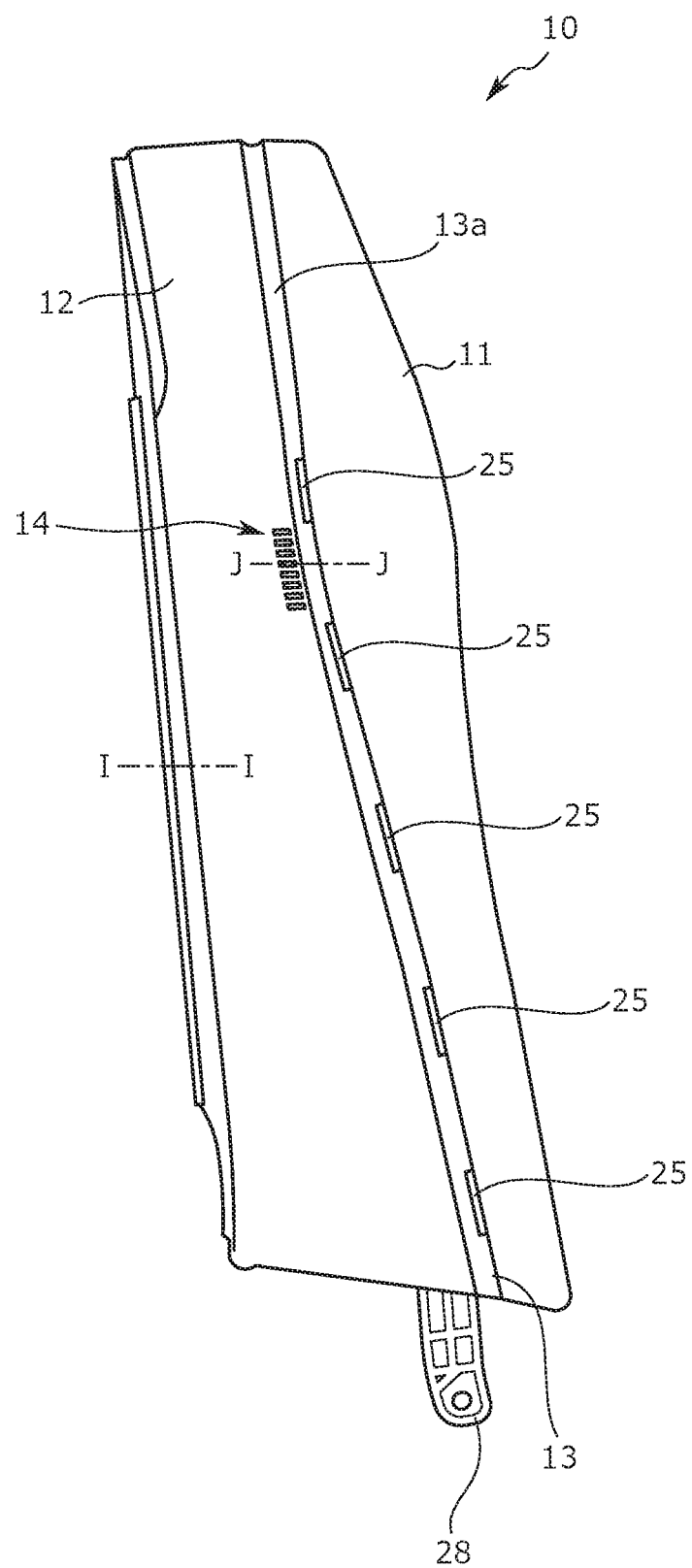
FIG. 6 is a front view of a base member (an obverse side of the base member)
Figure 7:
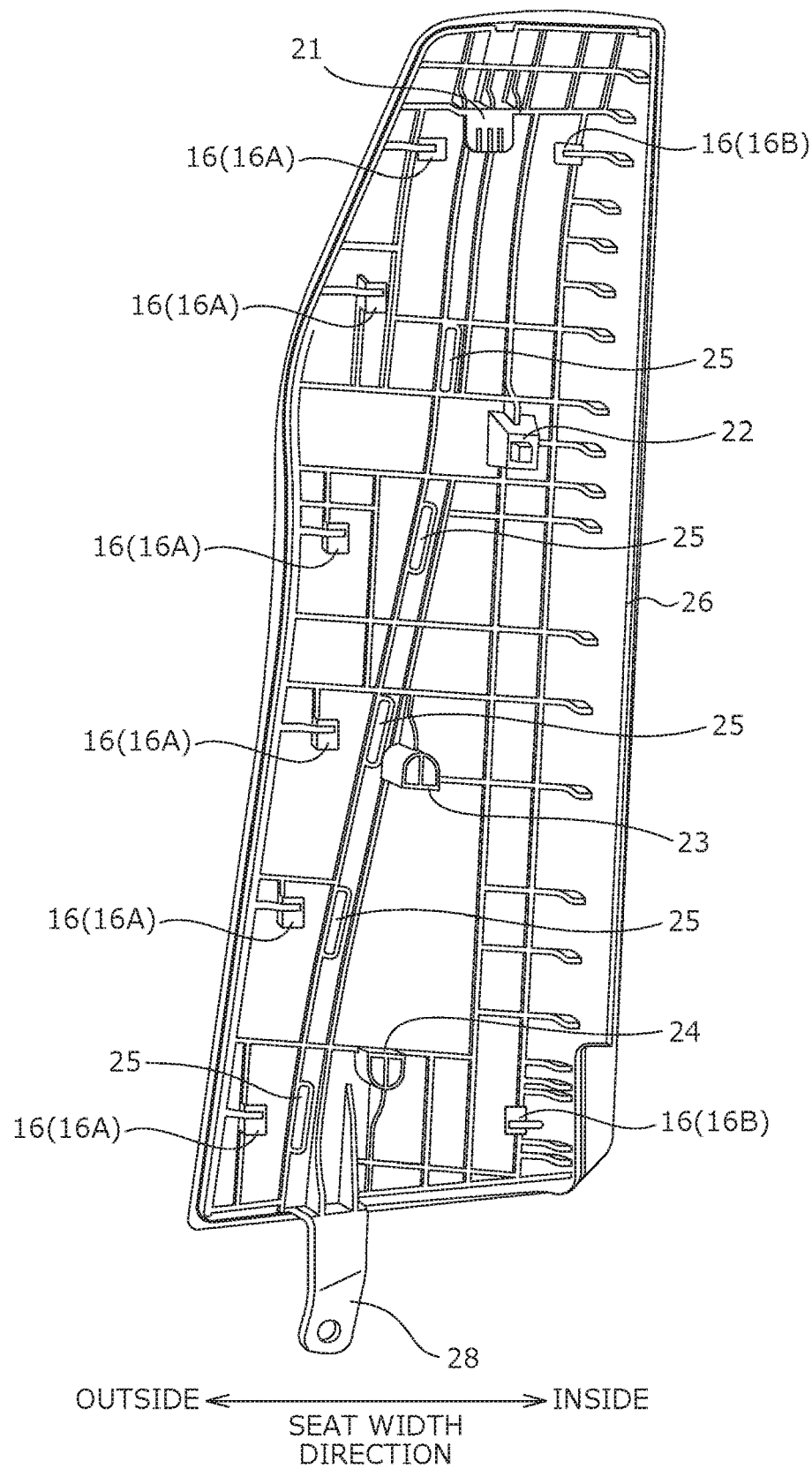
FIG. 7 is a rear view of the base member (a reverse side of the base member)
Figure 8:
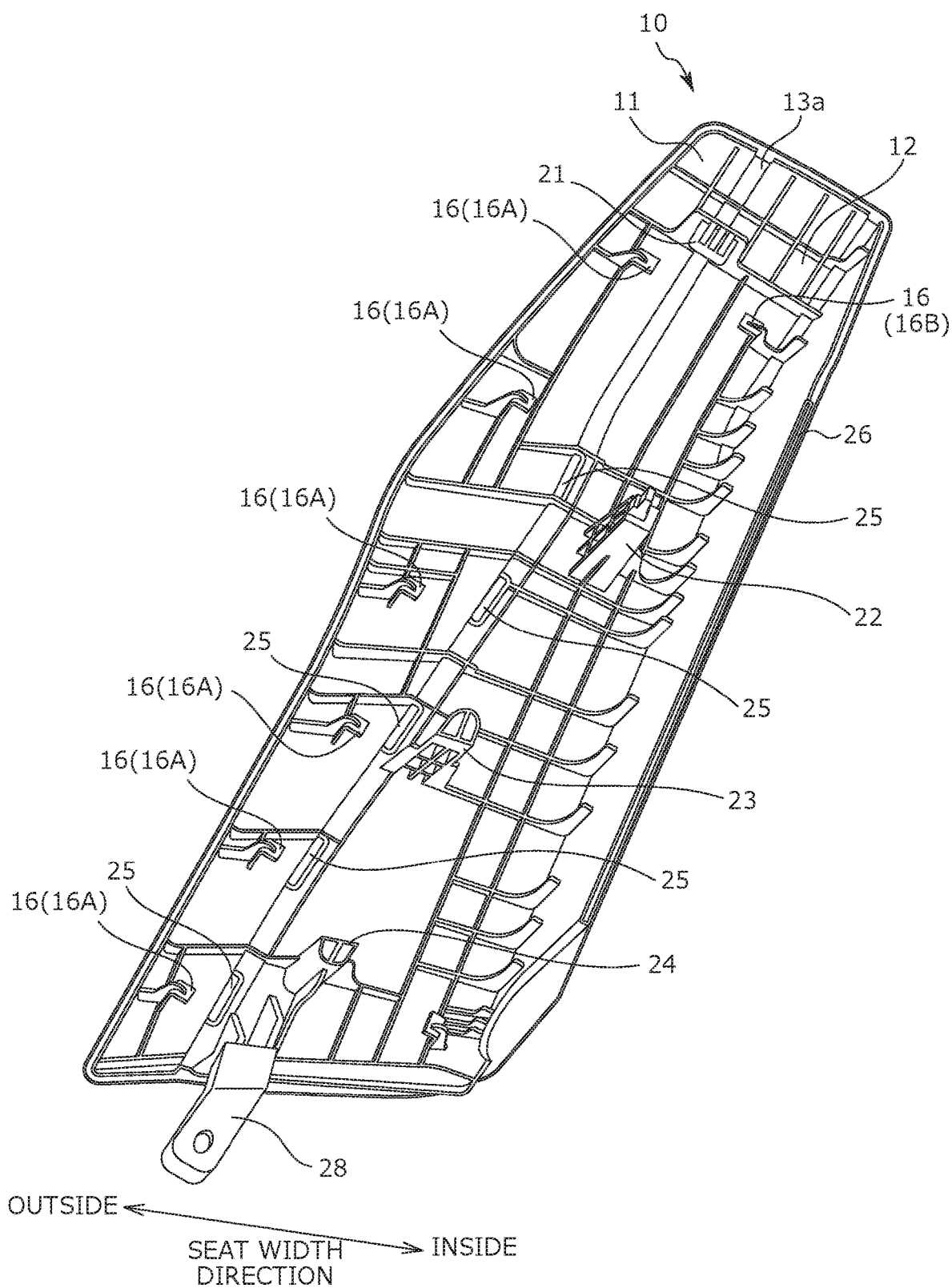
FIG. 8 is a perspective view of the reverse side of the base member when viewed obliquely from below.
Figure 9:
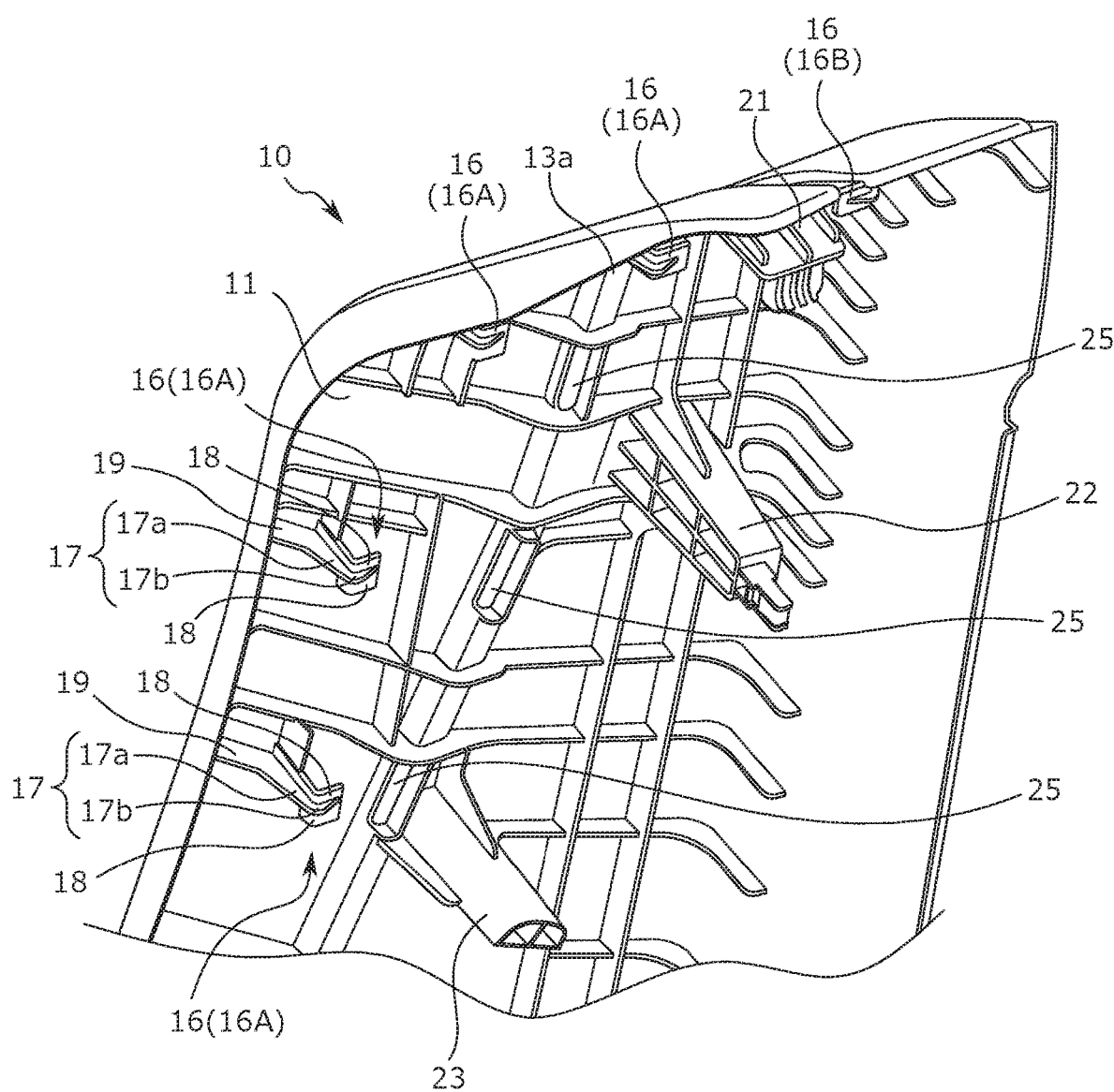
FIG. 9 is a partial, perspective view of an upper portion on the reverse side of the base member.
Figure 10:
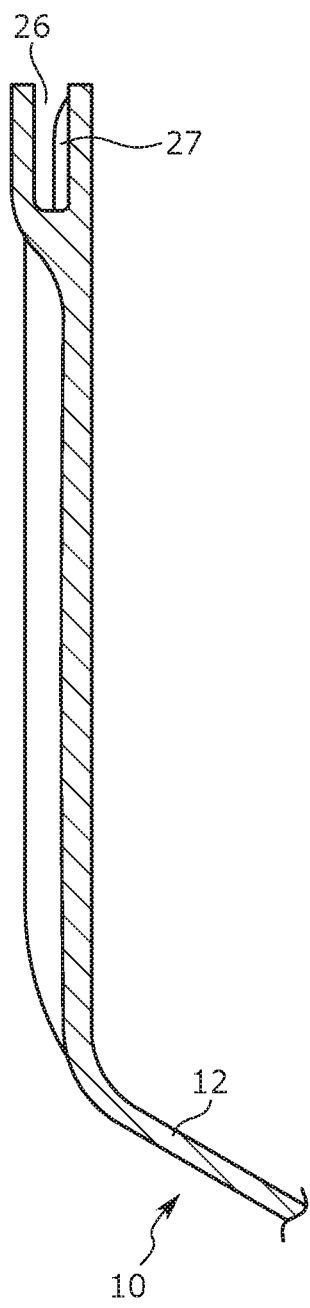
FIG. 10 is a cross-sectional view taken along I-I in FIG. 6.
Figure 11:
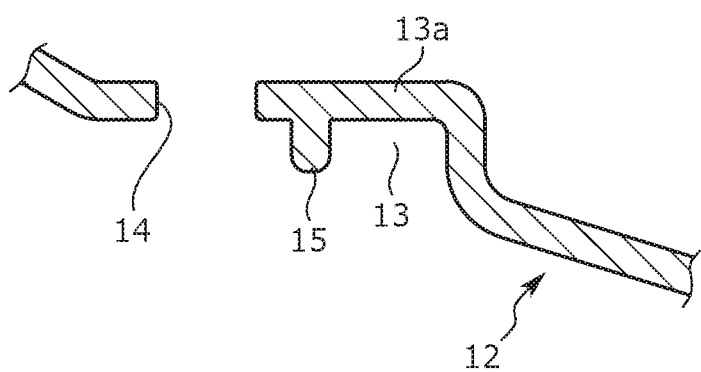
FIG. 11 is a cross-sectional view taken along J-J in FIG. 6.

The structure of the base member 10 is now described with reference to FIGS. 4 and 6 to 12. FIG. 6 shows the obverse side of the base member 10. FIG. 7 shows the reverse side of the base member 10. FIG. 8 shows the reverse side of the base member 10 when viewed obliquely from below. FIG. 9 is an enlarged view of an upper portion on the reverse side of the base member 10. FIG. 10 is a cross-sectional view taken along I-I in FIG. 6. FIG. 11 is a cross-sectional view taken along J-J in FIG. 6.

The base member 10, in an embodiment, is a resin molded article as described above providing an appearance shown in FIGS. 6 and 7. An attaching portion 28 extending downward in a tongue shape is provided in a lower end portion of the base member 10. A bolt hole is provided in a leading end portion (lower end portion) of the attaching portion 28, and a fastening bolt (not shown) inserted in the bolt hole fixes the attaching portion 28 to the vehicle body floor.

The base member 10 is divided mainly into two portions in the seat width direction and specifically has the outer base portion 11 positioned on the outside in the seat width direction and the inner base portion 12 positioned on the inside in the seat width direction. The outer base portion 11 is closer to the outside surface cover piece 33 than the inside surface cover piece 34 each forming the surface cover 30 in a state where the surface cover 30 is fastened to the base member 10. The inner base portion 12 is closer to the inside surface cover piece 34 of the surface cover 30 in a state where the surface cover 30 is fastened to the base member 10.

As shown in FIG. 6, an accommodation groove portion 13 formed in a manner to be recessed rearward is also provided in the surface of the base member 10. The accommodation groove portion 13 is formed from the upper end to the lower end of the base member 10. As shown in FIG. 4, in a state where the surface cover 30 covers the base member 10 to be fastened thereto, the interface 40 of the surface cover 30 then gains entry and is accommodated within the accommodation groove portion 13. That is, the interface 40, when drawn into the base member 10, gains entry into the accommodation groove portion 13.

It is noted that the accommodation groove portion 13 defines a boundary between the outer base portion 11 and the inner base portion 12 in the base member 10, in which the outer base portion 11 is positioned outside of the accommodation groove portion 13 in the seat width direction, while the inner base portion 12 is positioned inside of the accommodation groove portion 13 in the seat width direction. Further, as shown in FIG. 6, vertically arranged multiple holes having a relatively short rectangular shape (hereinafter referred to as "rectangular hole group 14") are provided alongside the accommodation groove portion 13 in the surface of the inner base portion 12. The rectangular holes of the rectangular hole group 14 are formed to take the base member 10 out of a mold during resin molding of the base member 10. It is noted that the portion of the inner base portion 12 positioned between the rectangular hole group 14 and the accommodation groove portion 13 in the seat width direction is formed as a thickened portion 15 with a thickness greater than the portion therearound, as shown in FIG. 11.

As shown in FIGS. 8 and 9, protrusion portions 16 protruding rearward are provided on the reverse side of the base member 10. The protrusion portions 16 are portions on which the outer end portion 31 and the inner end portion 32 of the surface cover 30 hang when the surface cover 30 is fastened to the base member 10. As the outer end portion 31 and the inner end portion 32 hang on the protrusion portions 16, the surface cover 30 covering the base member 10 is stretched.

Also, in this embodiment, the multiple protrusion portions 16 are provided on the reverse side of the base member 10 and, in more detail, the multiple protrusion portions 16 are provided vertically on the reverse side of each of the outer base portion 11 and the inner base portion 12. The protrusion portions 16 are hereinafter described in detail.

The multiple protrusion portions 16 (hereinafter referred to as "first protrusion portions 16A") provided on the reverse side of the outer base portion 11 are positioned in an outer end portion of the outer base portion 11 in the seat width direction and arranged along the accommodation groove portion 13. It is noted that in the case shown in FIG. 8, six first protrusion portions 16A are arranged with spacing therebetween. As shown in FIG. 9, the leading end portion of each first protrusion portion 16A is formed in a manner extending from the outer end toward the inner end of the base member 10 in the seat width direction.

To describe the configuration of each first protrusion portion 16A with reference to FIG. 9, the protrusion portion 16 has a core portion 17 forming the main body portion thereof. As shown in FIG. 9, the core portion 17 has a rearward protruding portion 17a extending rearward from the reverse side of the base member 10 and a leading end protruding portion 17b adjoining the leading end of the rearward protruding portion 17a. As described above, the leading end protruding portion 17b of the first protrusion portion 16A extends from the outer end toward the inner end of the base member 10 in the seat width direction (i.e., in a direction intersecting with the direction of protrusion of the rearward protruding portion 17a). That is, the leading end protruding portion 17b of the first protrusion portion 16A protrudes toward the center of the base member 10 in the seat width direction.

In this embodiment, as shown in FIG. 9, the first protrusion portions 16A are also arranged in the base member 10 between a portion opposed to the outer end portion 31 of the surface cover 30 and the accommodation groove portion 13 in the seat width direction. Here, the portion opposed to the outer end portion 31 is opposed to the outer end portion 31 that is folded along the outer edge of the base member 10 (specifically, an outer end portion in the seat width direction of the outer edge) on the reverse side of the base member 10.

Also, on each end face in the vertical direction of each core portion 17, a vertically extending portion 18 is provided extending vertically from the end face. The vertically extending portion 18 is provided to reinforce the core portion 17 of the first protrusion portion 16A. As shown in FIG. 9, the vertically extending portion 18 is bent in an L shape, the portion corresponding to one of the sides thereof extends from the rearward protruding portion 17a, while the portion corresponding to the other side extends from the leading end protruding portion 17b.

An adjacent protruding portion 19 adjoining the rearward protruding portion 17a of the core portion 17 is also provided in a base portion of the rearward protruding portion 17a. The adjacent protruding portion 19 is provided to reinforce the first protrusion portion 16A and protrudes rearward at a position adjoining the first protrusion portion 16A. As shown in FIG. 9, the adjacent protruding portion 19 also extends toward the outer edge of the base member 10 (specifically, the outer end portion in the seat width direction of the outer edge) in the seat width direction.

As shown in FIG. 8, the multiple protrusion portions 16 (hereinafter referred to as "second protrusion portions 16B") provided on the reverse side of the inner base portion 12 are arranged at vertically spaced positions. The second protrusion portions 16B each have a basic configuration similar to that of the first protrusion portions 16A, having a core portion 17 and a vertically extending portion 18 extending from the core portion 17. An adjacent protruding portion 19 also protrudes rearward at a position adjoining the core portion 17 of the second protrusion portion 16B.

As shown in FIG. 8, the leading end portion of each second protrusion portion 16B (specifically, the leading end protruding portion 17b of the core portion 17) is formed in a manner extending from the inner end toward the outer end of the base member 10 in the seat width direction. That is, like the leading end protruding portion 17b of each first protrusion portion 16A, the leading end protruding portion 17b of the second protrusion portion 16B protrudes toward the center of the base member 10 in the seat width direction.

Returning to the description of the configuration of the base member 10, multiple protrusions are formed on the reverse side of the base member 10 to fix the lateral support portion 4 to the vehicle body. To describe it specifically, a first fastening portion 21, a second fastening portion 22, a first contact portion 23, and a second contact portion 24 protrude rearward from the reverse side of the base member 10.

The first fastening portion 21 is a socket-type protrusion provided at an upper end position of the inner base portion 12 of the base member 10 and arranged to be engageable with an insertion portion (not shown) attached to the vehicle body when the insertion portion is inserted therethrough. That is, the first fastening portion 21 is engaged with a portion of the vehicle body in a state where the lateral support portion 4 is mounted on the vehicle body.

The second fastening portion 22 is a plug-type protrusion corresponding to a convex portion and provided at a position of the inner base portion 12 slightly lower than that of the first fastening portion 21 and arranged to be inserted through a reception portion (not shown) attached to the vehicle body to be engageable with the reception portion. That is, the second fastening portion 22 is engaged with a portion of the vehicle body in a state where the lateral support portion 4 is mounted on the vehicle body. As shown in FIG. 9, the amount of rearward protrusion of the second fastening portion 22 is larger than the amount of protrusion of the first protrusion portions 16A as well as the amount of protrusion of the second protrusion portions 16B.

The first contact portion 23 and the second contact portion 24 are each an approximately semicircular cylindrical body corresponding to a convex portion. The first contact portion 23 is in the inner base portion 12 at a position lower than that of the second fastening portion 22 and provided alongside the accommodation groove portion 13. The second contact portion 24 is positioned in a lower end portion of the inner base portion 12 and provided alongside the accommodation groove portion 13. The first contact portion 23 and the second contact portion 24 are each arranged to, when the lateral support portion 4 is mounted on the vehicle body, come into contact with a portion of the vehicle body to position the lateral support portion 4. As shown in FIG. 9, the amount of rearward protrusion of the first contact portion 23 is larger than the amount of protrusion of the first protrusion portions 16A as well as the amount of protrusion of the second protrusion portions 16B. Similarly, the amount of rearward protrusion of the second contact portion 24 is larger than the amount of protrusion of the first protrusion portions 16A as well as the second protrusion portions 16B.

It is noted that in this embodiment, as shown in FIG. 7, the second fastening portion 22, the first contact portion 23, and the second contact portion 24 are arranged between the first protrusion portions 16A and the second protrusion portions 16B in the seat width direction and, specifically, arranged between the outermost first protrusion portion 16A and the innermost second protrusion portion 16B in the seat width direction.

As shown in FIGS. 6, 7, and 8, rectangular slit holes 25 are formed in a bottom portion 13a of the accommodation groove portion 13 of the base member 10. The slit holes 25 penetrate through the bottom portion 13a of the accommodation groove portion 13, through which the strip-shaped bodies 35 are put when the surface cover 30 covers the base member 10 to draw the interface 40. That is, the strip-shaped bodies 35 are put through the slit holes 25 and pulled and drawn toward the reverse side of the base member 10.

In this embodiment, the multiple slit holes 25 are provided with spacing therebetween along the accommodation groove portion 13 and, in more detail, the number of the slit holes 25 provided is the same as that of the strip-shaped bodies 35 (i.e. five). That is, in this embodiment, the slit holes 25 are provided in the base member 10, one for each strip-shaped body 35, which is in turn to be put through corresponding one of the multiple slit holes 25.

It is noted that as shown in FIG. 4, each slit hole 25 has a rear end opening 25a formed to face outward (toward the vehicle door) in the seat width direction. This causes each strip-shaped body 35 to be put through each slit hole 25 such that the free end portion 35b of the strip-shaped body 35 faces outward in the seat width direction.

In this embodiment, as shown in FIG. 7, each slit hole 25 is also arranged between the first protrusion portions 16A (strictly the outermost first protrusion portion 16A in the seat width direction) and the above-described convex portion (specifically the second fastening portion 22) in the seat width direction.

As shown in FIGS. 7 and 8, the tuck groove 26 is provided in an inner end portion in the seat width direction of the reverse side of the base member 10. The tuck groove 26 is a groove into which the trim cord 37 attached to the inner end portion 32 of the surface cover 30 gains entry (is tucked) when the surface cover 30 is fastened to the base member 10.

The tuck groove 26 is provided in the inner base portion 12 of the base member 10. To describe it in more detail, as shown in FIG. 4, the inner base portion 12 is bent in an L shape such that the inner end portion thereof in the seat width direction extends rearward. The tuck groove 26 is then formed in the rear end face (i.e. the reverse side) of the inner end portion of the inner base portion 12 in a manner extending lengthwise in the vertical direction. It is noted that the inner end portion of the inner base portion 12 in the seat width direction, in which the tuck groove 26 is provided, corresponds to an end portion of the base member 10 closer to the second protrusion portions 16B than the first protrusion portions 16A in the seat width direction.

As shown in FIGS. 7 and 8, the tuck groove 26 is arranged between two of the second protrusion portions 16B provided at positions separated from each other in the vertical direction. Further, as shown in FIG. 10, a portion of the inner wall surface of the tuck groove 26 is raised to form a retaining bead 27. The retaining bead 27 thus formed allows the trim cord 37 tucked in the tuck groove 26 to be retained within the tuck groove 26.

How to Fasten the Surface Cover 30 to the Base Member 10

Figure 12:
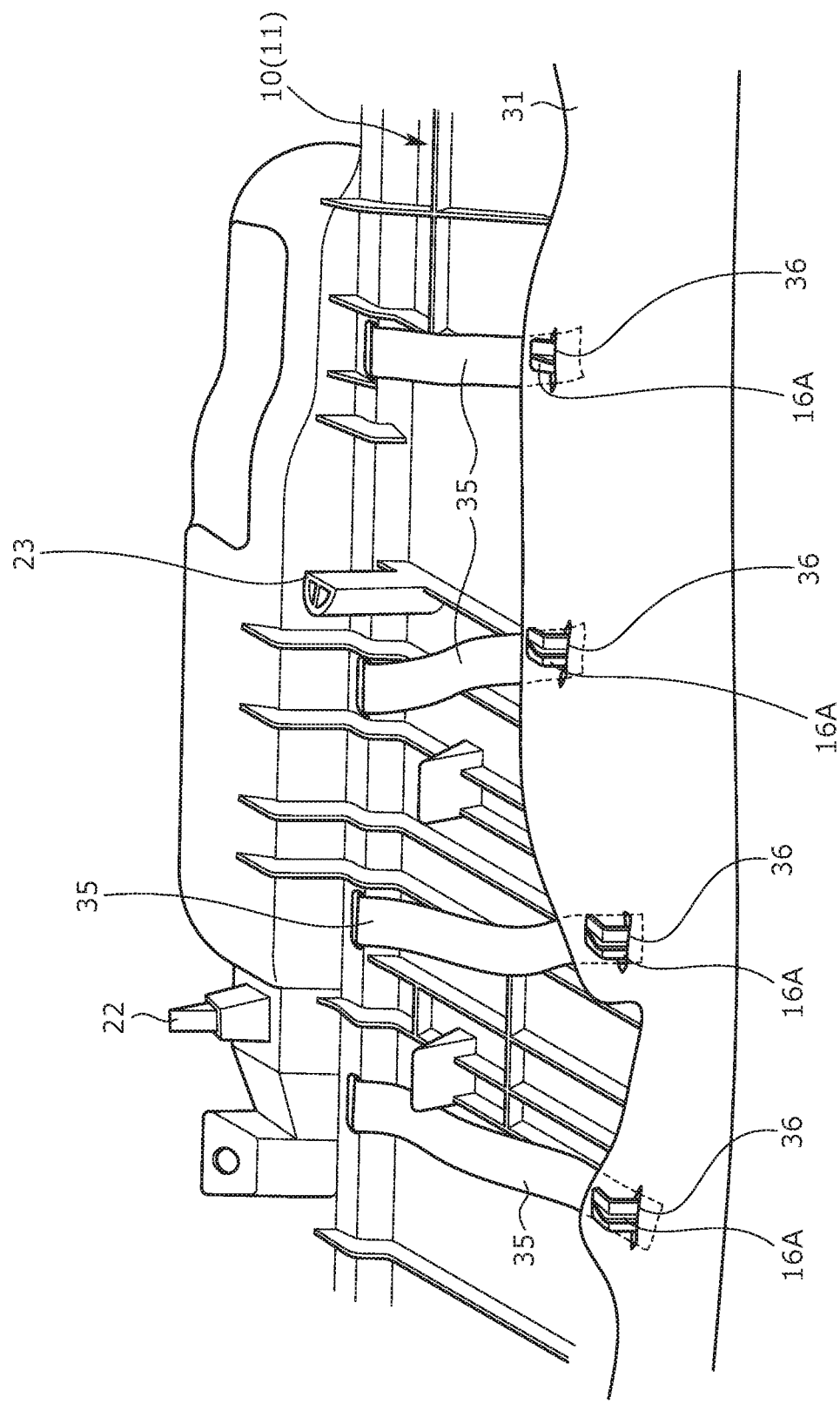
FIG. 12 is a perspective view of an arrangement in which the surface cover is stretched.
Figure 13:
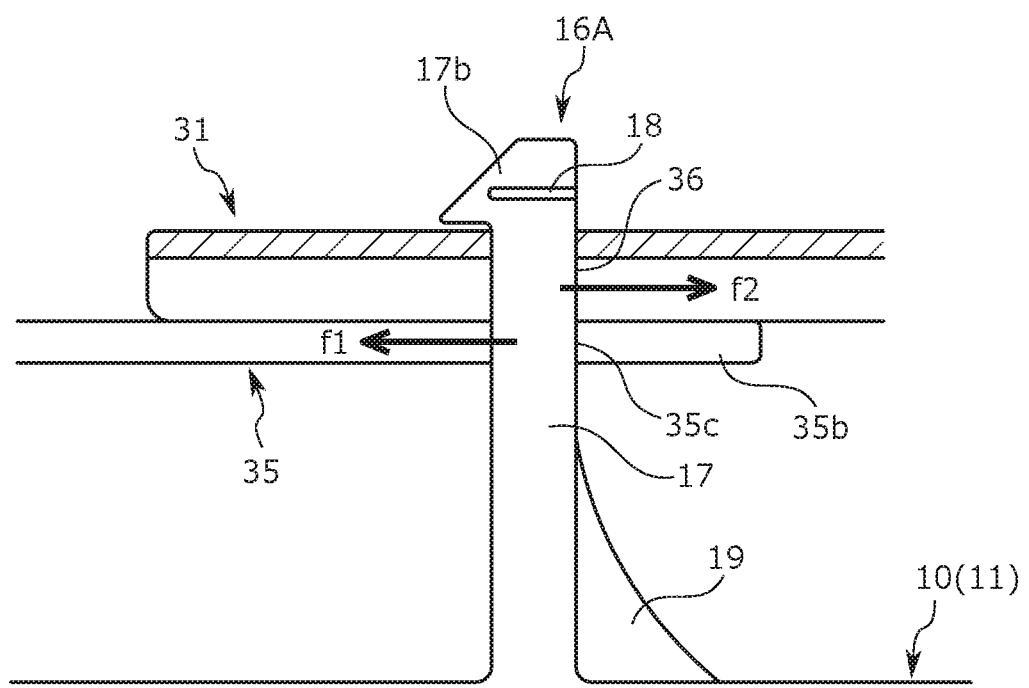
FIG. 13 is a side view of an extending portion and an end portion of the surface cover on which a protrusion portion hangs.

Next is described how to fasten the surface cover 30 to the base member 10 with reference to FIGS. 4, 12, and 13. FIG. 12 is an illustrative view of an arrangement in which the surface cover 30 covering the base member 10 is stretched. FIG. 13 is a side view of one of the strip-shaped bodies 35 and the outer end portion 31 of the surface cover 30 on which the corresponding first protrusion portion 16A hangs.

Upon fastening of the surface cover 30 to the base member 10, the surface cover 30 is brought close to the base member 10 from the front to cover the surface (front surface) of the base member 10. Upon this, as shown in FIG. 4, the interface 40 of the surface cover 30 gains entry into the accommodation groove portion 13.

To describe it in more detail, the multiple strip-shaped bodies 35 sewn at the interface 40 are put through the respective slit holes 25 formed in the bottom portion 13a of the accommodation groove portion 13 and pulled toward the reverse side of the base member 10. That is, in this embodiment, upon fastening of the surface cover 30 to the base member 10, the strip-shaped bodies 35 are put through the slit holes 25 in a state where the surface cover 30 covers the base member 10, and pulled toward the reverse side of the base member 10 (i.e. opposite to the side of the base member 10 on which the interface 40 is positioned).

It is noted that as shown in FIG. 4, in a state where the surface cover 30 covers the base member 10, the base portions 35a of the strip-shaped bodies 35 are accommodated (arranged) within the accommodation groove portion 13 together with the interface 40. As shown in FIG. 4, the opening 25a of each slit hole 25 (specifically, the opening 25a positioned on the reverse side of the base member 10) also faces outward in the seat width direction. The free end portions 35b of the strip-shaped bodies 35 are then brought out of the slit holes 25 through the openings 25a.

Also, in this embodiment, the multiple strip-shaped bodies 35 are attached to the interface 40, and the same number of slit holes 25 are formed in the base member 10. One of the strip-shaped bodies 35 is put correspondingly through each slit hole 25.

Also, in a state where the surface cover 30 covers the base member 10, a portion in the reverse side portion of the surface cover 30 to which the strip-shaped bodies 35 are attached and a portion of the base member 10 in which the slit holes 25 are provided are arranged in a manner overlapping each other. To describe it simply, in a state where the surface cover 30 covers the base member 10, the base portion 35a of each strip-shaped body 35 attached to the interface 40 is arranged at a position adjacent to the slit hole 25 through which the strip-shaped body 35 passes, as shown in FIG. 4. In accordance with this positional relationship, the length of each strip-shaped body 35 required to be put through the corresponding slit hole 25 can be reduced.

After the free end portion 35b of the strip-shaped body 35 is brought out of the slit hole 25 through the opening 25a of the slit hole 25, the strip-shaped body 35 is folded in an L shape at the middle thereof (specifically, a portion of the bottom portion 13a of the accommodation groove portion 13 opposed to the outer edge of the opening 25a) as shown in FIG. 4, while being kept pulled toward the reverse side of the base member 10 (i.e. rearward). This causes the free end portion 35b of the strip-shaped body 35 to be directed outward in the seat width direction.

On the other hand, the first protrusion portions 16A are provided on the reverse side of the outer base portion 11 of the base member 10, which is positioned outside in the seat width direction. As shown in FIGS. 4 and 12, the free end portion 35b of the strip-shaped body 35 then hangs on the leading end protruding portion 17b of the corresponding first protrusion portion 16A on the reverse side of the base member 10. To describe it specifically, the core portion 17 and the vertically extending portion 18 of the first protrusion portion 16A is inserted through the clasping hole 35c formed in the free end portion 35b, so that the free end portion 35b of the strip-shaped body 35 is engaged with the first protrusion portion 16A. It is noted that the first protrusion portions 16A are provided in the outer end portion in the seat width direction on the reverse side of the outer base portion 11 (one end portion of the base member 10). That is, in this embodiment, the free end portions 35b of the strip-shaped bodies 35 hang on the outer end portion in the seat width direction of the outer base portion 11. The openings 25a of the slit holes 25 through which the base portions 35a of the strip-shaped bodies 35 pass face outside in the seat width direction, that is, the side on which the first protrusion portions 16A are positioned. This arrangement allows the base portions 35a of the strip-shaped bodies 35 to be fastened to the first protrusion portions 16A more easily.

If all the strip-shaped bodies 35 are then engaged with the first protrusion portions 16A, the interface 40 to which the base portions 35a of the strip-shaped bodies 35 are attached gains entry and is drawn into the accommodation groove portion 13 together with the base portions 35a of the strip-shaped bodies 35.

After the drawing in of the interface 40 is completed, the outer end portion 31 of the surface cover 30 is fastened to the outer end portion in the seat width direction of the outer base portion 11. To describe it in more detail, the outer end portion 31 of the surface cover 30 is folded along a portion of the outer edge of the outer base portion 11 positioned at the outer end in the seat width direction to come around behind the outer base portion 11. As shown in FIG. 12, the outer end portion 31 coming around behind the outer base portion 11 then hangs on the first protrusion portions 16A. To describe it specifically, the core portions 17 and the vertically extending portions 18 of the first protrusion portions 16A are inserted through the multiple latch holes 36 formed with vertical spacing therebetween in the outer end portion 31. This causes the portion of the outer end portion 31 of the surface cover 30 coming around behind the outer base portion 11 to hang on the first protrusion portions 16A and be fastened to the outer end portion in the seat width direction of the outer base portion 11.

It is noted that in this embodiment, the same number of latch holes 36 as the first protrusion portions 16A are formed in the outer end portion 31 of the surface cover 30. One of the first protrusion portions 16A is inserted correspondingly through each latch hole 36.

As described above, the strip-shaped bodies 35 attached to the interface 40 and the outer end portion 31 of the surface cover 30 coming around behind the base member 10 hang on the first protrusion portions 16A. As shown in FIG. 13, the outer end portion 31 of the surface cover 30 hangs on a portion of each first protrusion portion 16A closer to the leading end of the first protrusion portion 16A (strictly the leading end protruding portion 17b of the core portion 17) than the portion on which the strip-shaped body 35 hangs.

Also, in a state where both the strip-shaped bodies 35 and the outer end portion 31 hang on the first protrusion portions 16A, the strip-shaped bodies 35 and the outer end portion 31 exert forces in mutually opposite directions on the first protrusion portions 16A. To describe it specifically, as shown in FIG. 4, the first protrusion portions 16A are arranged at the outer edge of the base member 10 between a portion behind which the outer end portion 31 of the surface cover 30 comes around and the slit holes 25 through which the strip-shaped bodies 35 are put.

The above-described positional relationship causes the strip-shaped bodies 35 to come close to the first protrusion portions 16A from a position inside of the first protrusion portions 16A in the seat width direction and hang on the first protrusion portions 16A. This results in that the strip-shaped bodies 35 exert a tensile load in the direction indicated by the arrow f1 in FIG. 13 on the first protrusion portions 16A. On the other hand, the outer end portion 31 of the surface cover 30 comes close to the first protrusion portions 16A from a position outside of the first protrusion portions 16A in the seat width direction and hangs on the first protrusion portions 16A. This results in that the outer end portion 31 exerts a tensile load in the direction indicated by the arrow f2 in FIG. 13 on the first protrusion portions 16A. Here, the two tensile loads are forces in mutually opposite directions. This can prevent the tensile loads acting on the first protrusion portions 16A from excessively concentrating in one direction.

The outer end portion 31 of the surface cover 30 is thus fastened to the outer end portion in the seat width direction of the outer base portion 11. On the other hand, the inner end portion 32 of the surface cover 30 is fastened to the inner end portion in the seat width direction of the inner base portion 12 of the base member 10. To describe it in more detail, the inner end portion 32 of the surface cover 30 is folded along a portion of the outer edge of the inner base portion 12 positioned at the inner end in the seat width direction. Further, a predetermined portion (specifically a portion in which the latch holes 36 are formed) of the inner end portion 32 comes around behind the inner base portion 12.

As described above, the two second protrusion portions 16B are provided at vertically spaced positions on the reverse side of the inner base portion 12. As shown in FIG. 4, the inner end portion 32 coming around behind the inner base portion 12 then hangs on the two upper and lower second protrusion portions 16B. To describe it specifically, the core portions 17 and the vertically extending portions 18 of the second protrusion portions 16B are inserted through the two respective latch holes 36 provided at vertically spaced positions in the inner end portion 32. This causes the portion of the inner end portion 32 of the surface cover 30 coming around behind the inner base portion 12 to hang on the second protrusion portions 16B.

Further, the trim cord 37 is attached to a portion of the inner end portion 32 positioned vertically between the two upper and lower second protrusion portions 16B. The trim cord 37 gains entry (is tucked) into the tuck groove 26 formed in the inner end portion in the seat width direction on the reverse side of the inner base portion 12. In this embodiment, the inner end portion 32 of the surface cover 30 thus hangs on the two upper and lower second protrusion portions 16B and is tucked into the tuck groove 26 vertically between the second protrusion portions 16B. Through the above-described procedure, each portion (specifically, the outer end portion 31, the inner end portion 32, and the interface 40) of the surface cover 30 is fastened to the base member 10. The surface cover 30 is then fastened to the base member 10 to thereby form the lateral support portion 4 according to this embodiment.

Other Embodiments

While the conveyance seat according to the present disclosure has heretofore been described with one specific example, the above-described embodiment is provided for better understanding of the present disclosure and not intended to limit the present disclosure. That is, it is appreciated that the present disclosure can be changed and modified without departing from the spirit thereof and includes its equivalents.

Figure 14:
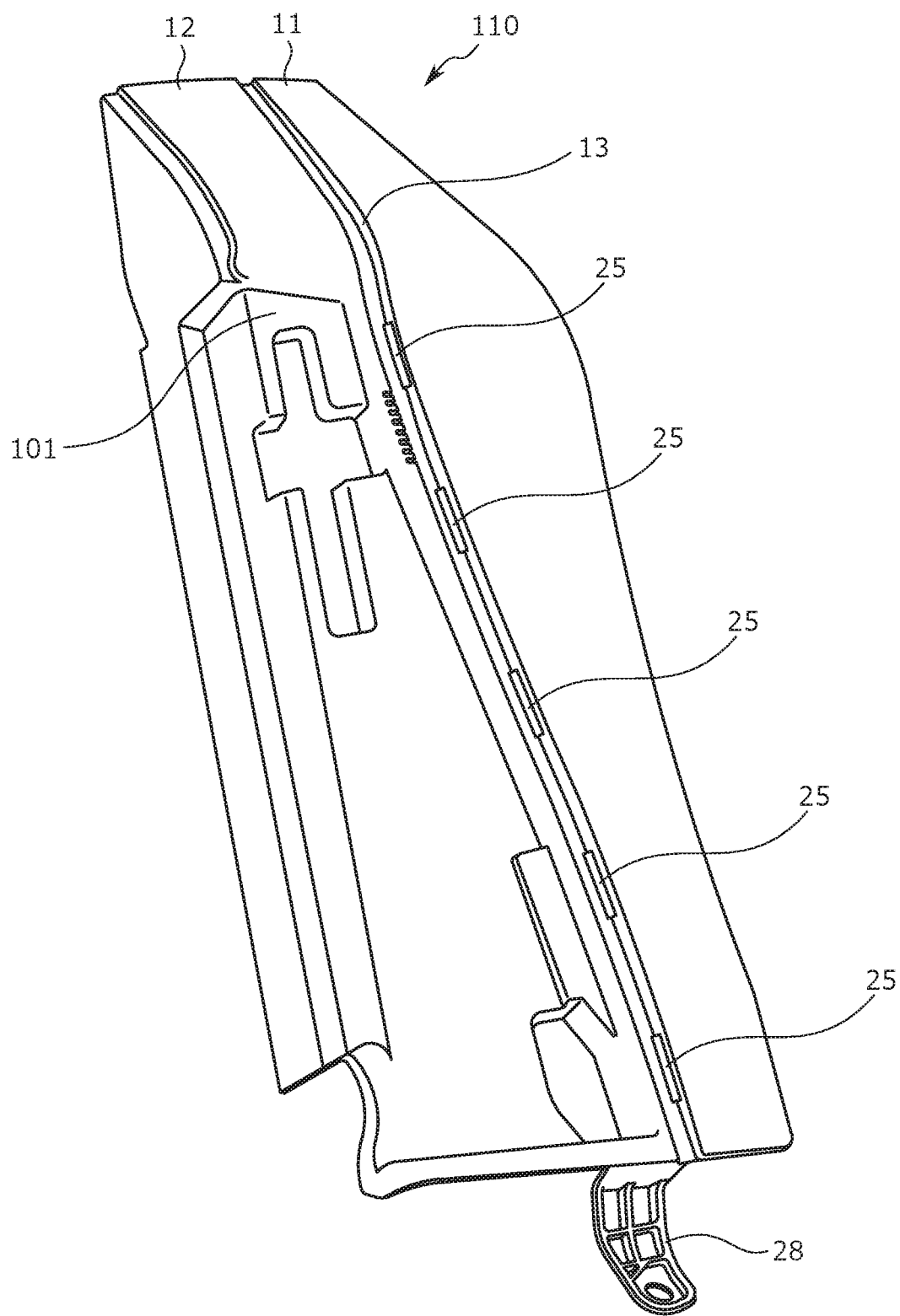
FIG. 14 is a perspective view of a base member according to a variation.

Also, the configuration of each portion of the seat S is merely an example and may differ from the above-described embodiment as long as at least some advantageous effects of the present disclosure can be exhibited (e.g., good appearance of the lateral support portion 4 can be achieved). For example, in the above-described embodiment, the surface cover 30 directly covers the base member 10 to form the lateral support portion 4. That is, in the above-described embodiment, as shown in FIG. 6, the obverse side (front side) of the base member 10 is a flat surface, directly in front of which the surface cover 30 is arranged, but the present disclosure is not limited thereto. As shown in FIG. 14, a base member 100 with a fitting recessed portion 101 formed in the surface thereof into which a pad material (not shown) is fitted may be used, and the surface cover 30 may cover the base member 100 with the pad material fitted into the fitting recessed portion 101 to form the lateral support portion 4. FIG. 14 is a perspective view of the base member 100 according to a variation. It is noted that the base member 100 according to the variation with the pad material fitted into the fitting recessed portion 101 has a structure approximately similar to that of the base member 10 according to the above-described embodiment shown in FIG. 6. Also, in FIG. 14, components of the base member 100 according to the variation common to those of the base member 10 according to the above-described embodiment are designated by common reference signs (i.e. the same reference signs as those shown in FIG. 6).

A conveyance seat according to this embodiment also has a back support portion for supporting the back of a seated person and a lateral support portion positioned lateral to the back support portion, in which the lateral support portion includes a base member for defining the outline of the lateral support portion and a surface cover arranged to cover the base member to form the outer surface of the lateral support portion, the surface cover includes multiple surface cover pieces interfaced with each other to form the surface cover, and the obverse side of the base member has a groove portion into which the interface between the surface cover pieces gains entry, while the reverse side of the base member has multiple protrusion portions on which an end portion of the surface cover hangs to stretch the surface cover along the groove portion.

The surface cover forming the lateral support portion may be formed by interfacing multiple surface cover pieces. In this arrangement, in order for the surface cover to cover the base member, it is necessary to, for example, pull the interface of the surface cover between the surface cover pieces to stretch the surface cover. Upon this, inadequate stretching of the surface cover could affect the appearance of the lateral support portion. In contrast, in the thus arranged conveyance seat, the interface of the surface cover between the surface cover pieces gains entry into the groove portion provided in the obverse side of the base member, and the end portion of the surface cover hangs on the multiple protrusion portions provided on the reverse side of the base member so that the surface cover is stretched. In this arrangement, since the end portion of the surface cover hangs on the multiple protrusion portions, the interface of the surface cover between the surface cover pieces can be prevented from being excessively pulled. This causes the interface between the surface cover pieces to be stretched adequately and, as a result, the lateral support portion provides good appearance. That is, in accordance with the conveyance seat, the surface cover can be stretched adequately on the lateral support portion.

In the conveyance seat, the protrusion portion also has a rearward protruding portion protruding rearward and a leading end protruding portion adjoining the leading end of the rearward protruding portion and protruding in a direction intersecting with the direction of protrusion of the rearward protruding portion. In accordance with the arrangement above, the end portion of the surface cover hanging on the protrusion portion can be prevented from coming away from the protrusion portion with a simpler structure.

Also, in the conveyance seat, it is preferred that the leading end protruding portion protrudes toward the central position of the base member in the width direction of the conveyance seat. In the arrangement above, the end portion of the surface cover is pulled toward the central position of the base member in the width direction of the conveyance seat to hang on the protrusion portion, while the leading end protruding portion of the protrusion portion protrudes toward the central position of the base portion. In accordance with this arrangement, the end portion of the surface cover hanging on the protrusion portion can be prevented effectively from coming away from the protrusion portion.

Also, in the conveyance seat, it is preferred that the surface cover includes an extending portion extending out of the interface between the surface cover pieces in a reverse side portion of the surface cover, the extending portion is pulled toward the side opposite to that on which the interface between the surface cover pieces is positioned with respect to the base member to hang on the protrusion portion, and the end portion of the surface cover hangs on a portion of the protrusion portion closer to the leading end of the protrusion portion than the portion on which the extending portion hangs. In the arrangement above, since both the extending portion attached to the interface of the surface cover between the surface cover pieces and the end portion of the surface cover hang on the protrusion portion, a simpler structure can be achieved compared to the case where portions on which the extending portion and the end portion of the surface cover hang respectively are provided separately.

Also, in the conveyance seat, it is preferred that the base member has a slit hole, the extending portion is put through the slit hole to be pulled toward the side opposite to that on which the interface between the surface cover pieces is positioned with respect to the base member, and the protrusion portion is arranged between a portion of the outer edge of the base member behind which the end portion of the surface cover comes around and the slit hole in the width direction of the conveyance seat. In the arrangement above, the end portion of the surface cover and the extending portion come close to the protrusion portion from mutually opposite sides in the width direction of the conveyance seat to hang on the protrusion portion. In accordance with this arrangement, the protrusion portion can be prevented from being applied with an excessive force in one direction in the width direction of the conveyance seat.

Also, in the conveyance seat, it is preferred that the protrusion portion has a core portion and a vertically extending portion extending from the core portion in the vertical direction of the lateral support portion. In the arrangement above, the protrusion portion, which has the vertically extending portion, can have an increased stiffness.

Also, in the conveyance seat, it is preferred that an adjacent protruding portion protruding at a position adjoining the protrusion portion is provided on the reverse side of the base member, and the adjacent protruding portion extends toward the outer edge of the base member in the width direction of the conveyance seat. In the arrangement above, the portion around the protrusion portion in the base member, which has the adjacent protruding portion, can have an increased stiffness.

Also, in the conveyance seat, it is preferred that a convex portion is provided on the reverse side of the base member, the convex portion having a larger amount of protrusion than the protrusion portion and, in a state where the lateral support portion is mounted on a vehicle body, engaged or in contact with a portion of the vehicle body. In the arrangement above, since the convex portion, which has a larger amount of protrusion than the protrusion portion, is engaged or in contact with the vehicle body, the protrusion portion can be prevented from coming into contact with the vehicle body to be damaged.

Also, in the conveyance seat, it is preferred that the protrusion portion has a first protrusion portion with a leading end portion thereof extending in a direction from one end toward the other end of the base member in the width direction of the conveyance seat and a second protrusion portion with a leading end portion thereof extending in a direction from the other end toward the one end of the base member in the width direction, and the convex portion is arranged between the first protrusion portion and the second protrusion portion in the width direction. In the arrangement above, since the convex portion is arranged between the first protrusion portion and the second protrusion portion in the width direction of the conveyance seat, the first protrusion portion and the second protrusion portion can be prevented from coming into contact with the vehicle body to be damaged.

Also, in the conveyance seat, it is preferred that multiple first protrusion portions and multiple second protrusion portions are provided in the vertical direction of the lateral support portion, a tuck groove is formed in an end portion of the base member closer to the second protrusion portions than the first protrusion portions in the width direction, one end portion of the surface cover in the width direction hangs on the multiple first protrusion portions, and the other end portion of the surface cover in the width direction hangs on the multiple second protrusion portions and gains entry into the tuck groove between the multiple second protrusion portions in the vertical direction. In the arrangement above, one end portion of the surface cover in the width direction of the conveyance seat hangs on the multiple first protrusion portions. The other end portion of the surface cover also hangs on the multiple second protrusion portions and tucked into the tuck groove in the base member between the multiple second protrusion portions in the vertical direction of the lateral support portion. In accordance with this arrangement, the vertically central portion of the surface cover, which is likely to get wrinkled, can be stretched adequately to be prevented effectively from getting wrinkled with a relatively simple structure.

TABLE OF REFERENCE NUMERALS 1 seat back
2 seat cushion
3 back support portion
4 lateral support portion
10 base member
11 outer base portion
12 inner base portion
13 accommodation groove portion (groove portion)
13a bottom portion
14 rectangular hole group
15 thickened portion
16 protrusion portion
16A first protrusion portion
16B second protrusion portion
17 core portion
17a rearward protruding portion
17b leading end protruding portion
18 vertically extending portion
19 adjacent protruding portion
20 outer edge outside portion
21 first fastening portion
22 second fastening portion (convex portion)
23 first contact portion (convex portion)
24 second contact portion (convex portion)
25 slit hole
25a opening
26 tuck groove
27 retaining bead
28 attaching portion
30 surface cover
31 outer end portion (one end portion)
32 inner end portion (the other end portion)
33 outside surface cover piece (first surface cover piece)
34 inside surface cover piece (second surface cover piece)
35 strip-shaped body (extending portion)
35a base portion
35b free end portion
35c clasping hole
36 latch hole
37 trim cord
40 interface (interface between surface cover pieces)
100 base member
101 fitting recessed portion
S seat (conveyance seat)

What is claimed is:
1. A conveyance seat, comprising:
a back support portion configured to support the back of a seated person; and
a lateral support portion positioned laterally relative to the back support portion; wherein:
the lateral support portion includes i) a base member that defines an outline of the lateral support portion, and ii)

a surface cover configured to cover the base member to form an outer surface of the lateral support portion;

the surface cover includes i) a plurality of surface cover pieces interfaced with each other to form the surface cover, and ii) an extending portion that extends out of an interface between the surface cover pieces on a reverse side portion of the surface cover;

in a state where the surface cover covers the base member, the extending portion is pulled toward a side of the base member opposite to a side on which the interface between the surface cover pieces is positioned with respect to the base member; and a reverse side of the base member has a protrusion portion on which a free end portion of the extending portion hangs, the free end portion being positioned on a side opposite to a side of a base portion of the extending portion to be attached to the interface between the surface cover pieces.

2. The conveyance seat according to claim 1, wherein the extending portion is a strip-shaped body, the base member has a slit hole, and in a state where the surface cover covers the base member, the strip-shaped body is put through the slit hole to be pulled toward the side of the base member opposite to that on which the interface between the surface cover pieces is positioned with respect to the base member.

3. The conveyance seat according to claim 2, wherein a plurality of strip-shaped bodies are provided along the interface between the surface cover pieces, and the base member has one slit hole for each of the plurality of strip-shaped bodies.

4. The conveyance seat according to claim 2, wherein in a state where the surface cover covers the base member, a portion in the reverse side portion of the surface cover to which the strip-shaped body is attached and a portion of the base member in which the slit hole is provided are arranged to overlap each other.

5. The conveyance seat according to claim 2, wherein the plurality of surface cover pieces include a first surface cover piece positioned on one end side and a second surface cover piece positioned on another end side in the width direction of the conveyance seat, the base portion of the extending portion to be attached to the interface between the surface cover pieces is attached to the interface between the surface cover pieces and is in contact with the first surface cover piece, and a free end portion of the extending portion positioned on the side opposite to that of the base portion is put through the slit hole and engaged with a portion of the base member closer to the first surface cover piece than the second surface cover piece.

6. The conveyance seat according to claim 2, wherein an opening of the slit hole faces one end side in the width direction of the conveyance seat, and a free end portion of the extending portion, positioned on a side of the extending portion opposite to that of the base portion of the extending portion to be attached to the interface between the surface cover pieces, leaves the slit hole through the opening to hang on one end portion of the base member in the width direction.

7. The conveyance seat according to claim 2, wherein the reverse side of the base member has:

a convex portion having a larger amount of protrusion than the protrusion portion and, in a state where the lateral support portion is mounted on a vehicle body, engaged or in contact with a portion of the vehicle body, and the slit hole is provided between the protrusion portion and the convex portion in the width direction of the conveyance seat.

8. The conveyance seat according to claim 1, wherein the plurality of surface cover pieces are interfaced by sewing, and the extending portion is sewn together with the plurality of surface cover pieces at the interface between the surface cover pieces.

9. The conveyance seat according to claim 1, wherein the extending portion is composed of a material less expansible than the material of the surface cover pieces.

10. The conveyance seat according to claim 1, wherein the surface of the base member is formed with a groove portion into which the interface between the surface cover pieces gains entry, and in a state where the surface cover covers the base member, the base portion of the extending portion that is attached to the interface between the surface cover pieces is arranged within the groove portion.

11. A base member for a conveyance seat, the base member comprising:

a protrusion portion provided on a reverse side of the base member, wherein the protrusion portion is configured to be engaged with a free end portion of an extending portion that extends out of an interface between surface cover pieces that form a surface cover for covering the base cover;

a groove portion into which the interface between the surface cover pieces gains entry and which is formed on a front surface of the base cover; and a contact portion configured to come into contact with a portion of a vehicle body of a conveyance, the contact portion being a convex portion and formed separately from the protrusion portion;

wherein the base member is configured to define an outline of a lateral support portion of the conveyance seat.

12. The base member according to claim 11, wherein the base member has a slit hole through which the extending portion of the surface cover put in a state where the surface cover covers the base member.

13. The base member according to claim 12, wherein the base member has a plurality of the slit holes.

14. The base member according to claim 12, wherein an opening of the slit hole faces one end side in a width direction of the conveyance seat.

15. The base member according to claim 12, further comprising:

a convex portion provided on the reverse side of the base member that has a larger amount of protrusion than the protrusion portion and, in a state where the lateral support portion is mounted on a vehicle body, is engaged or in contact with a portion of the vehicle body, wherein the slit hole is provided between the protrusion portion and the convex portion in a width direction of the conveyance seat.

16. A method for assembling a conveyance seat, the conveyance seat comprising:

a back support portion configured to support the back of a seated person; and a lateral support portion positioned laterally relative to the back support portion; wherein the lateral support portion includes i) a base member that defines an outline of the lateral support portion, and ii) a surface cover configured to cover the base member to form an outer surface of the lateral support portion, the surface cover includes i) a plurality of surface cover pieces interfaced with each other to form the surface cover, and ii) an extending portion that extends out of an interface between the surface cover pieces on a reverse side portion of the surface cover, in a state where the surface cover covers the base member, the extending portion is pulled toward a side of the base member opposite to a side on which the interface between the surface cover pieces is positioned with respect to the base member, a reverse side of the base member has a protrusion portion on which a free end portion of the extending portion hangs, the free end portion being positioned on a side opposite to a side of a base portion of the extending portion to be attached to the interface between the surface cover pieces, and the base member has a slit hole, the method comprising:
  passing the extending portion through the slit hole; and
  hanging the free end portion of the extending portion on the protrusion potion.

17. The method according to claim 16, further comprising:
  fastening an outer end portion of the surface cover on an outer end portion of the base member in a width direction of the conveyance seat.

* * * * *